US012606990B2

(12) United States Patent
Lee et al.

(10) Patent No.: US 12,606,990 B2
(45) Date of Patent: Apr. 21, 2026

(54) EXCAVATOR FOR DETECTING ROTATION OF UPPER BODY CONSIDERING DETECTED DEAD ZONE AND OPERATION METHOD THEREOF

(71) Applicant: HD HYUNDAI INFRACORE CO., LTD., Incheon (KR)

(72) Inventors: Heejin Lee, Incheon (KR); Youngjoon Kim, Bucheon-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 326 days.

(21) Appl. No.: 18/037,041

(22) PCT Filed: Oct. 19, 2021

(86) PCT No.: PCT/KR2021/014554
§ 371 (c)(1),
(2) Date: May 15, 2023

(87) PCT Pub. No.: WO2022/103002
PCT Pub. Date: May 19, 2022

(65) Prior Publication Data
US 2023/0407601 A1 Dec. 21, 2023

(30) Foreign Application Priority Data

Nov. 16, 2020 (KR) ........................ 10-2020-0152963

(51) Int. Cl.
*E02F 9/24* (2006.01)
*E02F 9/26* (2006.01)
(Continued)

(52) U.S. Cl.
CPC ................ *E02F 9/26* (2013.01); *G01B 21/22* (2013.01)

(58) Field of Classification Search
CPC ... E02F 9/26; E02F 9/123; E02F 9/261; E02F 9/205; E02F 3/435; E02F 9/268;
(Continued)

(56) References Cited

U.S. PATENT DOCUMENTS

| | | | | |
|---|---|---|---|---|
| 2014/0367189 A1* | 12/2014 | Minoshima | .............. | B62D 5/09 |
| | | | | 180/422 |
| 2016/0237655 A1* | 8/2016 | Baba | ..................... | E02F 9/2037 |
| 2019/0073256 A1* | 3/2019 | Iwami | ....................... | G06F 9/28 |

FOREIGN PATENT DOCUMENTS

| | | | | |
|---|---|---|---|---|
| CN | 111358561 A | * | 7/2020 | ....... A61B 17/00234 |
| FR | 3092914 A1 | * | 8/2020 | |

(Continued)

OTHER PUBLICATIONS

International Search Report issued on Feb. 8, 2022, for corresponding International Patent Application No. PCT/KR2021/014554, along with an English translation (5 pages).
(Continued)

*Primary Examiner* — Jelani A Smith
*Assistant Examiner* — George A Alcorn, III
(74) *Attorney, Agent, or Firm* — Hauptman Ham, LLP

(57) ABSTRACT

Embodiments of the present disclosure relate to an excavator for detecting the rotation of an upper body and an operation method thereof. According to an embodiment, the excavator comprises: a lower body; an upper body rotatably mounted on the lower body; a sensor device configured to collect sensing information related to a rotation of the upper body relative to the lower body; and a processor electrically connected to the sensor device, wherein the processor is configured to detect occurrence of a dead zone based on the sensing information collected by the sensor device, correct the sensing information in response to detection of the dead (Continued)

310

| rotation angle of upper body | 359.8 ° → 0.2 ° | | | | |
|---|---|---|---|---|---|
| sampling period | 1 | 2 | 3 | 4 | 5 |
| sensor output information | 359.8 | 240 | 120 | 60 | 0.2 |

312

320

| rotation angle of upper body | 359.8 ° → 0.2 ° | | | | |
|---|---|---|---|---|---|
| sampling period | 1 | 2 | 3 | 4 | 5 |
| corrected sensing information | 359.8 | 359.8 | 120 | 60 | 0.2 |

322

330

| rotation angle of upper body | 359.8 ° → 0.2 ° | | | | |
|---|---|---|---|---|---|
| sampling period | 1 | 2 | 3 | 4 | 5 |
| corrected sensing information | 359.8 | 359.8 | 359.8 | 359.8 | 0.2 |

332 zone occurrence, and calculate a rotation angle of the upper body based on the corrected sensing information.

9 Claims, 6 Drawing Sheets

(51) Int. Cl.
  *G01B 7/30*          (2006.01)
  *G01B 21/22*          (2006.01)

(58) Field of Classification Search
  CPC ........... E02F 9/264; E02F 9/2025; E02F 9/24;
                          G01B 21/22; G01B 7/30
  USPC ......................................................... 701/33.4
  See application file for complete search history.

(56)                    References Cited

FOREIGN PATENT DOCUMENTS

| | | | | |
|---|---|---|---|---|
| JP | 61076910 | A | * | 4/1986 |
| JP | 2001-311605 | A | | 11/2001 |
| JP | 2003-4438 | A | | 1/2003 |
| JP | 2008-214997 | A | | 9/2008 |
| KR | 960013595 | B1 | * | 10/1996 |
| KR | 10-2012-0110370 | A | | 10/2012 |
| KR | 10-2016-0111102 | A | | 9/2016 |
| KR | 10-2016-0118636 | A | | 10/2016 |
| KR | 10-1727522 | B1 | | 4/2017 |
| KR | 10-2020-0089997 | A | | 7/2020 |

OTHER PUBLICATIONS

Written Opinion issued on Feb. 8, 2022, for corresponding International Patent Application No. PCT/KR2021/014554 (4 pages).
The extended European Search Report dated Sep. 30, 2024 for corresponding European Patent Application No. 21892172.4, 4 pages.

* cited by examiner

310

| rotation angle of upper body | 359.8 ° → 0.2 ° | | | | |
|---|---|---|---|---|---|
| sampling period | 1 | 2 | 3 | 4 | 5 |
| sensor output information | 359.8 | 240 | 120 | 60 | 0.2 |

312

320

| rotation angle of upper body | 359.8 ° → 0.2 ° | | | | |
|---|---|---|---|---|---|
| sampling period | 1 | 2 | 3 | 4 | 5 |
| corrected sensing information | 359.8 | 359.8 | 120 | 60 | 0.2 |

322

330

| rotation angle of upper body | 359.8 ° → 0.2 ° | | | | |
|---|---|---|---|---|---|
| sampling period | 1 | 2 | 3 | 4 | 5 |
| corrected sensing information | 359.8 | 359.8 | 359.8 | 359.8 | 0.2 |

332

EXCAVATOR FOR DETECTING ROTATION OF UPPER BODY CONSIDERING DETECTED DEAD ZONE AND OPERATION METHOD THEREOF

CROSS REFERENCE TO RELATED APPLICATION

The present application is a national stage filing under 35 U.S.C § 371 of PCT application number PCT/KR2021/014554 filed on Oct. 19, 2021, which is based upon and claims the benefit of priority to Korean Patent Application No. 10-2020-0152963, filed on Nov. 16, 2020, in the Korean Intellectual Property Office. All of the aforementioned applications are incorporated herein by reference in their entireties.

TECHNICAL FIELD

Various embodiments of the present disclosure relate to an excavator for detecting rotation of an upper body and an operation method thereof.

BACKGROUND ART

In general, the upper and lower bodies of an excavator are rotatably coupled. Accordingly, manual manipulation of an operator is required to rotate and move the upper body of the excavator to a working point.

However, when an unskilled operator controls the rotation position and speed of the upper body, a very large error may occur, and the working time is greatly increased, reducing overall work efficiency. In addition, vibration and impact may be applied to the excavator when the speed is not controlled upon reaching a target point.

In order to improve this, an excavator has been proposed that calculates the rotation angle of the upper body using a sensor provided at a joint part between the upper body and the lower body and provides the calculated result to an operator.

However, the rotation detection range of the sensor may include a dead zone in which rotation cannot be detected in a specific area due to the characteristics of the upper body rotating 360°. For example, there is a problem in that the sensor outputs an abnormal sensing value in the dead zone, and thus the accuracy of calculating the rotation angle of the upper body is lowered.

Recently, in order to eliminate the dead zone, a method of providing a plurality of sensors and covering the dead zone corresponding to each sensor with another sensor has been proposed. However, this method has a problem in that cost increases and the volume of parts increases as a plurality of sensors is provided.

DISCLOSURE

Technical Problem

An object to be solved by the present disclosure is to provide an excavator and an operating method thereof for improving rotation detection accuracy of an upper body.

An object to be solved by the present disclosure is to provide an excavator and an operating method thereof for calculating a rotation angle of an upper body by correcting a sensing value output from a dead zone The technical problem to be solved by the present disclosure is not limited to the above-mentioned technical problems. Other technical problems not mentioned can be clearly understood from the embodiments of the present disclosure by a person having ordinary skill in the art.

Technical Solution

An excavator according to various embodiments of the present disclosure may comprise a lower body, an upper body rotatably mounted on the lower body, a sensor device configured to collect sensing information related to a rotation of the upper body relative to the lower body, and a processor electrically connected to the sensor device, wherein the processor may control to detect occurrence of a dead zone based on the sensing information collected by the sensor device, to correct the sensing information in response to detection of the dead zone occurrence, and to calculate a rotation angle with respect to the upper body based on the corrected sensing information.

A method for operating an excavator according to various embodiments of the present disclosure may comprise collecting sensing information related to rotation of an upper body of the excavator, detecting occurrence of a dead zone based on the sensing information, correcting the sensing information in response to detection of the dead zone occurrence, and calculating a rotation angle of the upper body based on the corrected sensing information.

Advantageous Effects

In an excavator according to embodiments of the present disclosure, when a dead zone is detected while detecting rotation of an upper body, sensing information of a previous sampling period is used as sensing information of a current sampling period, based on a change in rotation of the upper body, so that rotation detection performance for the upper body can be improved.

Advantageous effects that can be obtained from the present disclosure are not limited to the above-mentioned effects. Further, other unmentioned effects can be clearly understood from the following descriptions by those skilled in the art to which the present disclosure belongs.

MODE FOR INVENTION

Figure 1A:
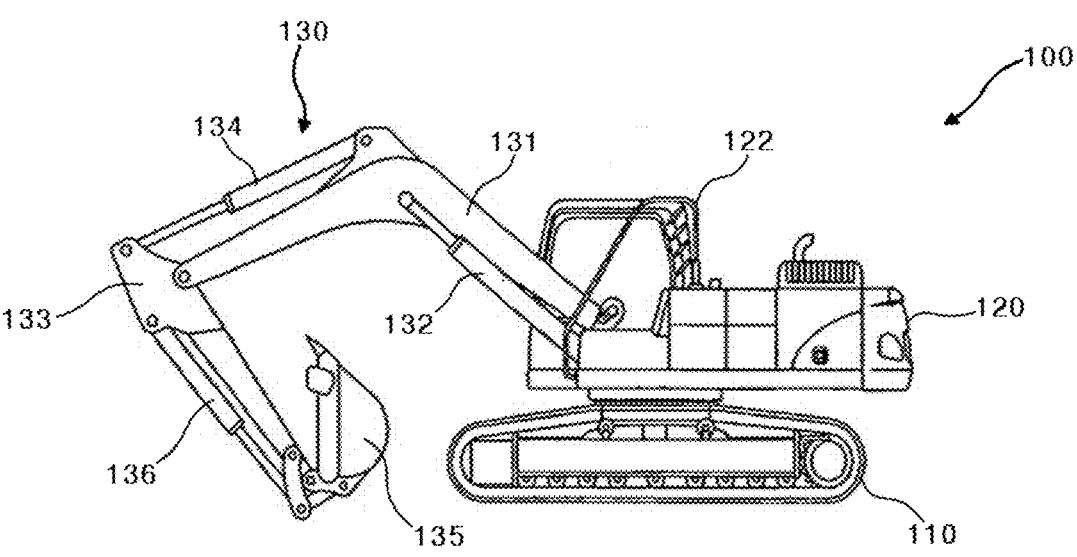
FIG. 1A is a diagram illustrating an excavator according to various embodiments of the present disclosure.

Advantages and features of the present disclosure, and an apparatus and method for achieving them will be apparent from referring to the following detailed embodiments described as well as the accompanying drawings. However, the present disclosure is not limited to the embodiment to be disclosed below and is implemented in different and various forms. The embodiments bring about the complete disclosure of the present disclosure and are provided to make those skilled in the art fully understand the scope of the present disclosure. The present disclosure is just defined by the scope of the appended claims. The same reference numerals throughout the disclosure correspond to the same elements.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present disclosure, and not intended to be limiting. In the present specification, an expression of a singular form includes the expression of plural form thereof if not specifically stated. The terms "comprises" and/or "comprising" used in the specification is intended to specify component, steps, operations, and/or elements which are mentioned in the specification, and intended not to exclude the existence or addition of at least one another components, steps, operations, and/or elements.

While terms such as the first and the second, etc., can be used to describe various components, the components are not limited by the terms mentioned above. The terms are used only for distinguishing between one component and other components.

Therefore, the first component to be described below may be the second component within the spirit of the present disclosure. Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present specification.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC).

Figure 1B:
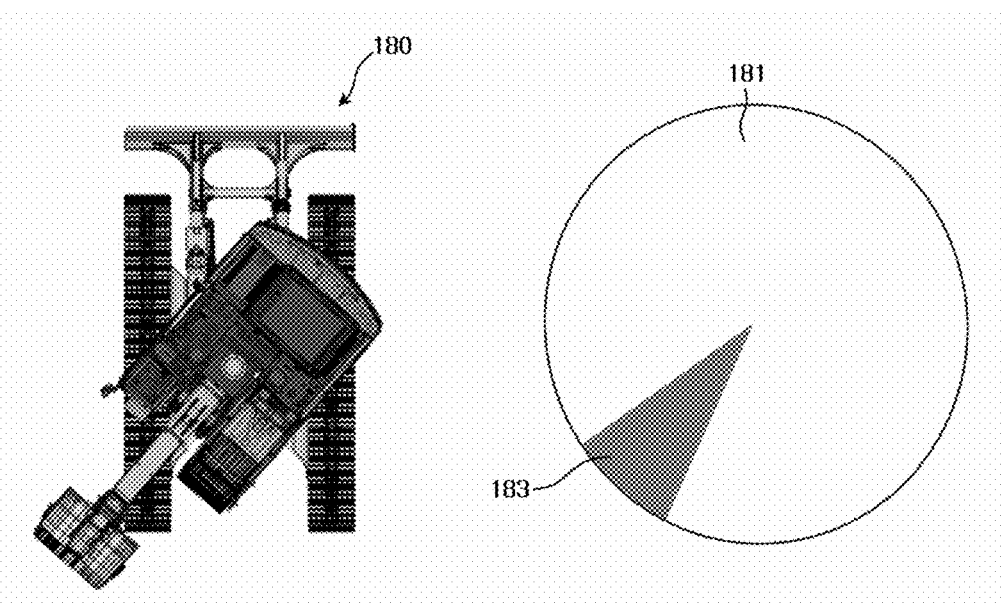
FIG. 1B is a diagram illustrating a rotation sensor provided in an excavator according to various embodiments of the present disclosure.

FIG. 1A is a diagram illustrating an excavator 100 according to various embodiments of the present disclosure, and FIG. 1B is a diagram illustrating a rotation sensor provided in the excavator 100 according to various embodiments of the present disclosure. In the following description, the excavator 100 is described as an example of a construction machine, and the present disclosure is not limited to the excavator 100. For example, the present disclosure may be applied to various machines provided with a rotatable upper body, such as a crane. In addition, the excavator 100 according to various embodiments includes a manned excavator that is operated by an operator on board, and an unmanned excavator that is operated by external manipulation regardless of the operator's boarding, and additionally, it may mean including an autonomous working excavator that can operate autonomously without an operator or external manipulation.

Referring to FIG. 1A, the excavator 100 may be configured to comprise a lower body 110 that serves to move, an upper body 120 mounted on the lower body 110 and rotating 360 degrees, and a front work device 130 coupled to the front of the upper body 120. However, this is only an example, and embodiments of the present disclosure are not limited thereto. For example, one or more other components (e.g., a plate coupled to the rear of the lower body 110, etc.) may be added in addition to the components of the excavator 100 described above.

According to various embodiments, the upper body 120 may include an operation cab 122 in which an operator boards and operates, and may include an internal space (not shown) where a power generator (e.g., an engine) can be mounted. The operation cab 122 may be provided on a portion close to the work area. The work area is a space in which the excavator 100 works and is located in front of the excavator 100. For example, the on-board operator may perform work under the secured field of view, and the operation cab 122 may be, as shown in FIG. 1A, close to the work area and be located at a position biased to one side of the upper body 120, in consideration of the position where the front work part 130 is mounted.

According to various embodiments, the front work part 130 may be mounted on the top surface of the upper body 120 and may perform work such as land excavation, transportation of a heavy object, etc. According to one embodiment, the front work device 130 may include a boom 131 rotatably coupled to the upper body 120, a boom cylinder 132 which rotates the boom 131, and an arm 133 rotatably coupled to the front end of the boom 131, an arm cylinder 134 which rotates the arm 133, a bucket 135 rotatably coupled to the front end of the arm 133, and a bucket cylinder 136 which rotates the bucket 135. During the operation of the excavator 100, one end of the boom 131, one end of the arm 133, and one end of the bucket 135 perform a rotational motion individually to maximize an area that the bucket 135 can reach. Since the aforementioned front work device 130 has been known in various documents, a detailed description thereof will be omitted.

According to various embodiments, the lower body 110 may be coupled to the bottom surface of the upper body 120. The lower body 110 may include a carriage formed in a wheel type using wheels or in a crawler type using a caterpillar. The traveling body may implement forward, backward, left and right movement of the excavator 100 by using power generated by the power generator as a driving force. According to one embodiment, the lower body 110 and the upper body 120 may be rotatably coupled by a center joint. The carriage may implement forward, backward, right, and left movements of the excavator 100 by using the power generated by the power generator as a driving force. According to the embodiment, the lower body 110 and the upper body 120 may be rotatably coupled by a center joint.

According to various embodiments, the excavator 100 may include a plurality of sensors for collecting information related to the state of the excavator 100 and/or information related to the surrounding environment.

According to one embodiment, the plurality of sensors may include a first sensor for detecting a state of the excavator 100. For example, the state of the excavator 100 may include a rotational state of the front work device 130. The first sensor may be disposed on the boom 131, the arm 133, and the bucket 135, respectively, or may be disposed on the joints (e.g., a hinge connection portion) of the boom 131, arm 133, and bucket 135 to detect the rotational state of each of the boom 131, the arm 133, and the bucket 135.

As another example, the state of the excavator 100 may include a rotational state of the upper body 120 (or the lower body 110). The first sensor may include a rotation sensor (or a turning sensor) disposed at the center joint to detect a rotational state of the upper body 120.

The rotation sensor may be disposed to align a rotation direction in a pose with a low rotation frequency in a dead zone in order to minimize occurrence of a dead zone. The rotation frequency refers to a rate at which the upper body 120 stays at a specific angle per unit time. In addition, the pose with low rotation frequency may include the pose in which it is least likely to be remained stationary during work, the pose in which it is least likely to be stopped for the operator's boarding and alighting before and after work, the pose in which it is least likely to be maintained for driving, and the like. For example, as indicated by reference numeral 180 in FIG. 1B, based on the excavator 100 equipped with a blade for leveling the ground, a case where there is a high possibility that the bucket 135 and the carriage (e.g., track or wheel) collide during operation, or a case where it is very inconvenient in boarding/alighting because there is no stepping structure between the operation cab 122 and the ground, which is a pose in which the boarding/alighting location of the operation cab 122 is at the center of the carriage equipped with a blade in the opposite direction, may be the pose with low rotation frequency. In addition, in general, the excavator 100 aligns the upper body 120 to the front or rear and travels, and in leveling operation, the excavator 100 may align the upper body 120 at an angle to a lateral 90° or 270° and perform leveling while moving little by little to the side. Therefore, the pose of traveling while maintaining the oblique rotation angle may be referred to as the pose with low rotation frequency. Considering the above situation, the rotation sensor is provided in the direction of approximately 225° (or −135°) with respect to the front of the excavator 100 (e.g., 0°), and thus, is aligned in the dead zone 183, and the remaining area may be set as a sensing range 181. However, this is only an example, and the location of the rotation sensor is not limited thereto.

According to one embodiment, the plurality of sensors may include a second sensor for detecting the work area in which the excavator 100 performs work. As described above, the work area is a space in which the excavator 100 works and may be located in front of the excavator 100. The second sensor may be disposed on a portion of the upper body 120, which is close to the work area, for example, on one side close to the front work device 130 on the top surface of the operation cab 122, and may detect the work area. However, this is only an example, and the location of the second sensor is not limited thereto. For example, the second sensor may be additionally or selectively disposed on the front work device 130, for example, on the arm 133 or the bucket 135 in order to detect the work area.

According to the embodiment, the plurality of sensors may include a third sensor for detecting obstacles around the excavator 100. The third sensor may be disposed in the front, side and rear of the upper body 220 and may detect obstacles around the excavator 100. The location of the above-described third sensor is an example, and the present disclosure is not limited thereto. The third sensor may be disposed at various locations capable of detecting obstacles around the excavator 100.

According to various embodiments, the various sensors described above may include an angle sensor, an inertial sensor, a rotation sensor, an electromagnetic wave sensor, a camera sensor, a radar, a lidar, an ultrasonic sensor, etc. For example, the first sensor may include at least one of the angle sensor, the inertial sensor, or the rotation sensor, and the second sensor and the third sensor may include at least one of the electromagnetic wave sensor, the camera sensor, the radar, the lidar, or the ultrasonic sensor. For example, the camera sensor disposed on the top surface of the operation cab 122 and the arm 133 of the excavator 100 may be used as the second sensor. In addition, the lidar disposed on the front of the excavator 100, the ultrasonic sensor disposed on the side and rear of the excavator 100, or the camera sensor disposed on the front, side, and rear of the excavator 100 may be used as the third sensor. Additionally or alternatively, when an image sensor is used as the second sensor and the third sensor, the image sensor may be composed of a stereo vision system capable of obtaining an image showing the distance information of an object.

In addition, the first sensor, the second sensor, and the third sensor may perform the same or similar operation to each other. For example, by using the third sensor for detecting obstacles around the excavator 100, the operation of the second sensor for detecting the work area in which the excavator 100 performs work may be performed.

According to various embodiments, the excavator 100 may comprise at least one positioning device.

According to an embodiment, a global navigation satellite system (GNNS) module capable of receiving satellite signals may be used as the positioning device, and a real time kinematic (RTK) GNSS module may be used as the positioning device for precise measurement. For example, at least one positioning device may be disposed on the upper body 120 of the excavator 100.

Figure 2:
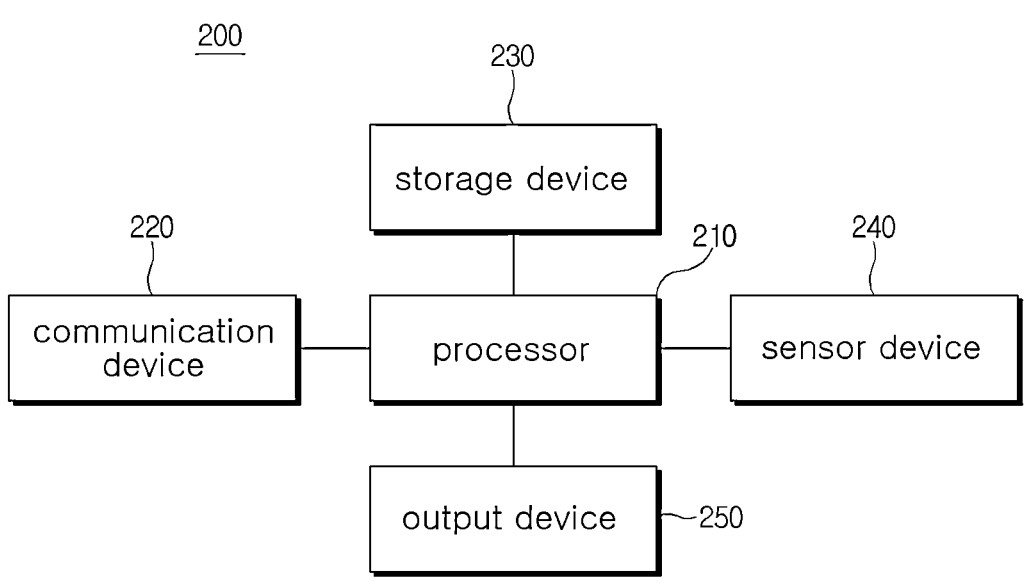
FIG. 2 is a diagram conceptually illustrating an excavator according to various embodiments of the present disclosure.
Figure 3:
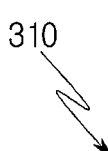
FIG. 3 is a diagram illustrating an operation of correcting sensing information according to various embodiments of the present disclosure.
Figure 3:
Figure 3:

FIG. 2 is a diagram conceptually illustrating an excavator 200 according to various embodiments of the present disclosure. Further, FIG. 3 is a diagram illustrating an operation of correcting sensing information according to various embodiments. The excavator 200 described with reference to FIG. 2 may comprise the excavator 100 illustrated in FIG. 1A or 1B.

Referring to FIG. 2, an excavator 200 may comprise a processor 210, a communication device 220, a storage device 230, a sensor device 240, and an output device 250.

According to various embodiments, the communication device 220 may transmit/receive data to/from an external device using wireless communication technology. Here, the communication technologies used by the communication device 220 may include Global System for Mobile communication(GSM), Code Division Multi Access(CDMA), Long Term Evolution(LTE), 5G, Wireless LAN(WLAN), Wireless-Fidelity(Wi-Fi), Bluetooth, Radio Frequency Identification(RFID), Infrared Data Association(IrDA), ZigBee, Near Field Communication(NFC), and the like. Also, the communication device 220 may include at least one positioning device.

According to various embodiments, the storage device 230 may store various data used by at least one component (e.g., the processor 210, the communication device 220, the sensor device 240, or the output device 250) of the excavator 200. According to one embodiment, the storage device 230 may store specifications of the excavator 200 (e.g., model name, serial number, basic specifications), map data, and the like. For example, the storage device 230 may include at least one of a non-volatile memory device and a volatile memory device.

According to various embodiments, the sensor device 240 may collect information related to at least one of a state of the excavator 200, a work area of the excavator 200, or an obstacle around the excavator 200 using various sensors. As described above, the sensor device 240 may include a first sensor, a second sensor, and a third sensor. For example, at least one of the angle sensor, the inertial sensor, and the rotation sensor for collecting information related to the state of the excavator 200 may be used as a component of the sensor device 240, and at least one of the electromagnetic wave sensor, the camera sensor, the radar, the lidar, and the ultrasonic sensor for collecting information related to an obstacle may be used as a component of the sensor device 240. However, this is only an example, and embodiments of the present disclosure are not limited thereto. For example, various types of sensors capable of collecting information related to the state of the excavator 200, a work area of the excavator 200, or obstacles around the excavator 200 may be used as components of the sensor device 240.

According to various embodiments, the sensor device 240 may include a first sensor member fixed to the upper body of the excavator 200 and a second sensor member fixed to the lower body. Some of the first sensor, the second sensor, and the third sensor may correspond to the first sensor member, and the remaining sensors may correspond to the second sensor member.

According to various embodiments, the output device 250 may generate an output related to the operation of the excavator 200. According to one embodiment, the output device 250 may include a display device which outputs visual information, an audio data output device which outputs auditory information, and a haptic module which outputs tactile information. For example, the display device may include a liquid crystal display(LCD), a light emitting diode(LED) display, an organic light emitting diode(OLED)

display, or a microelectromechanical system(MEMS) display, or electronic paper or the like. Also, the audio data output device may include at least one of a speaker, an earphone, an earset, and a headset which are included in the excavator 200 or connected to the excavator 200 in a wired or wireless manner.

According to various embodiments, the processor 210 may be configured to control the overall operation of the excavator 200. According to one embodiment, the processor 210 executes software (e.g., a program) stored in the storage device 230, thereby controlling at least one of the components connected to the processor 210 (e.g., the communication device 220, the storage device 230, the operating device 240, or the output device 250), and performing various data processing or operation. For example, as at least a part of data processing or operation, the processor 210 may store instructions or data received from other components in the storage device 230, process the instructions or data stored in the storage device 230, and store the result data in the storage device 230. The processor 210 may include a main processor and an auxiliary processor which can be operated independently of or together with the main processor. According to one embodiment, the processor 210 may perform a controller area network(CAN) communication with the aforementioned components (e.g., the communication device 220, the storage device 230, the sensor device 240, or the output device 250), but the present disclosure is not limited thereto.

According to one embodiment, the processor 210 may calculate a rotation angle of the upper body 120. The rotation angle may mean a turning angle of the upper body 120 with respect to the lower body 110 of the excavator 200. For example, the rotation angle may be calculated based on the sensing information collected through the sensor device 240 (e.g., a rotation sensor (or a turning sensor)).

According to one embodiment, the sensor device 240 may include a dead zone in which sensing information on the rotation angle is not provided or incorrectly provided in one area, and the processor 210 may detect the occurrence of the dead zone while calculating the rotation angle. The dead zone may be a sensing range (e.g., approximately 359° to 0.1°) in which rotation cannot be detected due to the characteristics of the upper body 120 rotating 360°. For example, the dead zone may occur in a situation where the rotation sensor outputs the maximum value (or minimum value) without outputting the minimum value (or maximum value) of the measurement range for the upper body 120 rotating in a direction from 0.2° to 359.8° (or in a direction from 359.8° to 0.2°). In addition, the dead zone may occur in a situation where for the upper body 120 rotating approximately 0.4° (or 359.6°) in the direction of 0.2° to 359.8° (or in the direction of 359.8° to 0.2°), the rotation sensor outputs a value corresponding to a rotation of approximately 359.6° (or 0.4°) in the opposite direction. In addition, the dead zone may occur in a situation where for the upper body 120 rotating approximately 0.4° (or 359.6°) in the direction of 0.2° to 359.8° (or in the direction of 359.8° to 0.2°), the rotation sensor outputs an abnormal chattering value.

According to one embodiment, in response to the detection of the dead zone occurrence, the processor 210 may measure an amount of change in rotation of the upper body 120 based on the sensing information. The rotation change amount may be measured based on a difference between sensing information measured in a previous sampling period of the rotation sensor and sensing information measured in a current sampling period.

According to one embodiment, the processor 210 may correct the sensing information based on the rotation change amount and the reference change amount. The reference change amount may be the maximum change amount that the upper body 120 can rotate in the current sampling period. For example, the processor 210 may not use the sensing information obtained in the current sampling period to measure the rotation angle when a rotation change amount exceeds a reference change amount. In this case, the processor 210 may replace the sensing information obtained in the previous sampling period with the sensing information obtained in the current sampling period and use it to measure the rotation angle.

For example, it is assumed that as indicated by reference numeral 310 in FIG. 3, when the upper body 120 rotates approximately 0.4° in the direction of 359.8° to 0.2° in the dead zone, the rotation sensor outputs the sensing information 312 corresponding to 359.8°→240°→120°→60°→0.2°.

In this case, as indicated by reference numeral 320 in FIG. 3, the processor 210 compares the sensing information of the first sampling period and the sensing information of the second sampling period to calculate the amount (e.g., 119.8°) of change in rotation of the upper body 120. In this case, the processor 210 calculate the rotation change amount (e.g., 240.2°) for the situation in which the upper body 120 rotates in a first direction (e.g., a clockwise direction) and the rotation change amount (e.g., 119.8°) for the situation in which the upper body 120 rotates in a second direction (e.g., a counterclockwise direction), and then, uses the rotation change amount having a relatively small value among the calculated rotation change amounts as the rotation change amount for the upper body 120. In addition, the processor 210 may ignore the sensing information of the second sampling period exceeding the reference change amount (e.g., 20°) or replace it with the sensing information of the first sampling period (322).

Also, as indicated by reference numeral 330 in FIG. 3, the processor 210 may compare the sensing information of the second sampling period and the sensing information of the third sampling period to determine the amount of change in rotation of the upper body 120. In this case, the sensing information of the second sampling period that has been replaced with the sensing information of the first sampling period may be compared with sensing information of the third sampling period in order to determine the amount of change in rotation of the upper body 120. The processor 210 calculates the amount of change in rotation of the upper body 120 with respect to the fourth and fifth sampling periods in the above-described manner, and the sensing information of the fourth sampling period exceeding the reference change amount may be replaced with the sensing information of the previous sampling period, and the sensing information of the fifth sampling period that does not exceed the reference change amount may be used as it is for calculating the rotation angle.

In summary, the abnormal sensing information 312 output by the rotation sensor in the dead zone, as indicated by reference numeral 310 in FIG. 3, may be corrected with the sensing information 332 to be normally output by the rotation sensor, as indicated by reference numeral 330 in FIG. 3.

According to one embodiment, the processor 210 may detect a measurement error while calculating the rotation angle of the upper body 120. A measurement error may be occurred in a situation in which the rotation change amount of the upper body 120 exceeds the reference change amount.

Also, the measurement error may be occurred in a situation in which sensing information exceeding a reference measurement range is obtained through the rotation sensor. The reference measurement range may be a sensing range of the rotation sensor. In addition, the measurement error may be occurred in a situation in which sensing information (e.g., a chattering value) exceeding a range of the dead zone is obtained through a rotation sensor in a dead zone.

According to one embodiment, the processor 210 may perform a sensor initialization operation when a measurement error greater than or equal to a threshold value is detected. The sensor initialization operation may include an operation of correcting an output value while rotating the upper body 120 at a reference speed. In this case, the processor 210 may notify the sensor initialization operation through the output device 250.

According to various embodiments, at least one of the above-described components of the excavator 200 may be omitted or one or more other components may be added to the configuration of the excavator 200. For example, the excavator 200 may be equipped with an operating device.

According to one embodiment, an operating device may receive a command or data to be used for operation control of the excavator 200. The operating device may include an operating lever for operating at least a portion of the front work part 130 (e.g., the boom 131, the arm 133, and the bucket 135), a handle for operating the steering of the lower body 110, and a shift lever for operating the moving speed of the excavator 100 or forward and backward traveling, and the like. According to one embodiment, the operating device may be provided in the operation cab 122 described above with reference to FIG. 1A.

Figure 4:
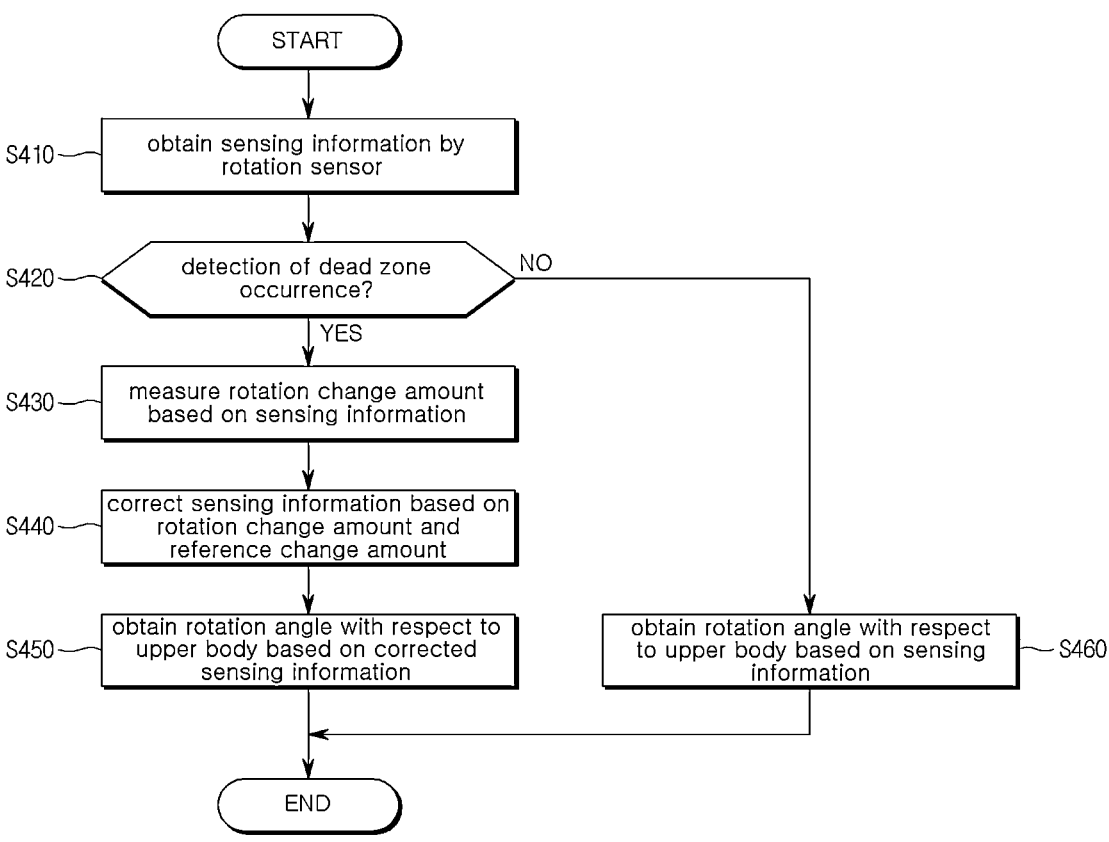
FIG. 4 is a flowchart of an operation of obtaining a rotation angle of an upper body in an excavator according to various embodiments of the present disclosure.

FIG. 4 is a flowchart of an operation of obtaining a rotation angle of the upper body 120 in the excavator 200 according to various embodiments of the present disclosure. In the following embodiments, each operation may be performed sequentially, but not necessarily sequentially. In addition, the following operations may be performed by the processor 210 of the excavator 200 or implemented as instructions executable by the processor 210.

Referring to FIG. 4, the excavator 200 according to various embodiments may obtain sensing information through a rotation sensor in operation S410. At least some of the acquired sensing information may include information to be used to measure a turning angle of the upper body 120 with respect to the lower body 110.

According to various embodiments, the excavator 200 may determine whether the dead zone is detected in operation S420. As described above, the dead zone may be a sensing range (e.g., approximately 359° to 0.1°) in which rotation cannot be detected due to the characteristics of the upper body 120 rotating 360°. For example, the excavator 200 may determine the occurrence of the dead zone in which the rotation sensor outputs the maximum value (or minimum value) without outputting the minimum value (or maximum value) of the measurement range for the upper body 120 rotating in the direction of 0.2° to 359.8° (or in the direction of 359.8° to 0.2°). In addition, the excavator 200 may detect the occurrence of the dead zone in which for the upper body 120 rotating approximately 0.4° (or 359.6°) in the direction of 0.2° to 359.8° (or in the direction of 359.8° to 0.2°), the rotation sensor outputs a value corresponding to a rotation of approximately 359.6° (or 0.4°) in the opposite direction. In addition, the excavator 200 may determine the occurrence of the dead zone in which for the upper body 120 rotating approximately 0.4° (or 359.6°) in the direction of 0.2° to 359.8° (or in the direction of 359.8° to 0.2°), the rotation sensor outputs an abnormal chattering value.

According to various embodiments, when the occurrence of the dead zone is not detected, the excavator 200 may obtain a rotation angle of the upper body 120 based on the sensing information in operation S460.

According to various embodiments, when the occurrence of a dead zone is detected, the excavator 200 may correct the sensing information through operations S430 to S450 and measure the rotation angle of the upper body 120 based on the corrected sensing information.

According to one embodiment, the excavator 200 may measure the amount of change in rotation of the upper body 120 based on the sensing information in operation S430. The rotation change amount may refer to a rotation degree of the upper body 120 based on the previous sampling period of the rotation sensor.

According to one embodiment, the excavator 200 may correct the sensing information based on the rotation change amount and the reference change amount in operation S440. The reference change amount may be the maximum change amount that the upper body 120 can rotate in the current sampling period.

For example, as described with reference to FIGS. 2 and 3, the excavator 200 may perform the correction operation of replacing the sensing information obtained in the previous sampling period with the sensing information obtained in the current sampling period when the rotation change amount exceeds the reference change amount.

According to one embodiment, the excavator 200 may obtain the rotation angle of the upper body 120 based on the corrected sensing information in operation S450.

Figure 5:
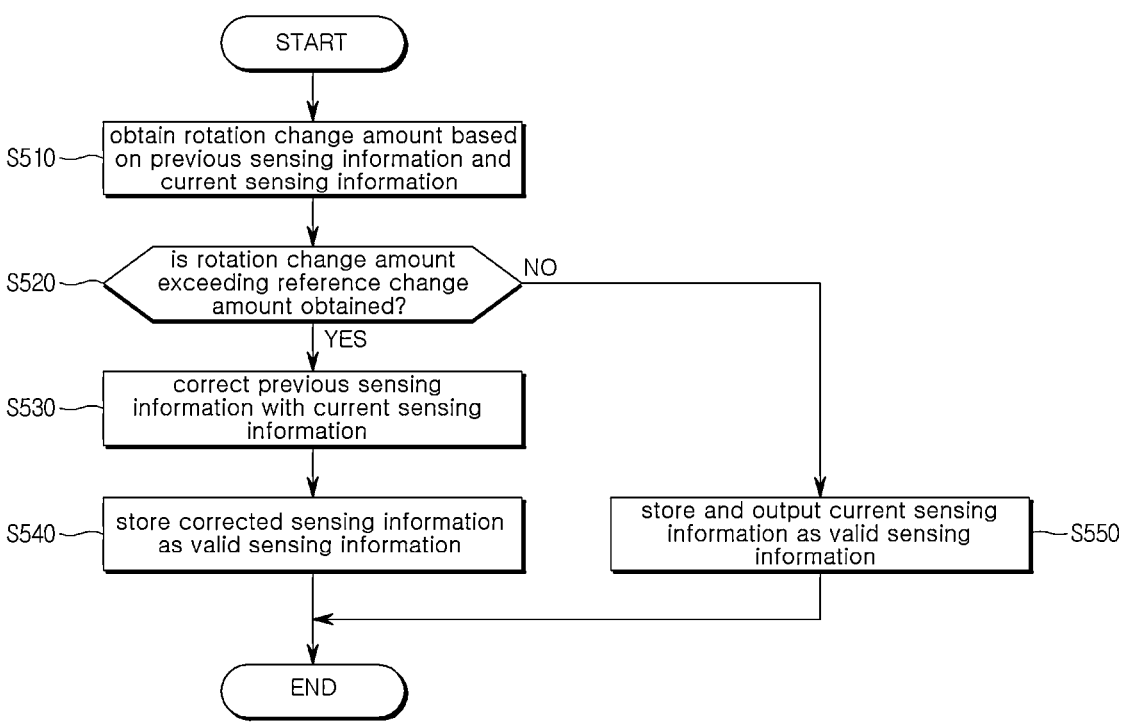
FIG. 5 is a flowchart of a first embodiment of a method of correcting sensing information in an excavator according to various embodiments.

FIG. 5 is a flowchart of a first embodiment of a method of correcting sensing information in an excavator 200 according to various embodiments. Operations in FIG. 5 described below may represent various embodiments of operations S430 and S440 in FIG. 4. In addition, in the following embodiments, each operation is not necessarily performed sequentially, and at least one operation among the disclosed operations may be omitted or other operations may be added.

Referring to FIG. 5, in operation S510, the excavator 200 according to various embodiments may measure an amount of change in rotation of the upper body 120 based on the sensing information measured in the previous sampling period and the sensing information measured in the current sampling period. For example, the amount of change in rotation of the upper body 120 may be measured based on a difference between the sensing information measured in the previous sampling period and the sensing information measured in the current sampling period.

According to various embodiments of the present disclosure, the excavator 200 may determine whether a rotation change amount exceeding a reference change amount is obtained in operation S520. For example, the excavator 200 may determine whether a rotation exceeding a maximum change amount that the upper body 120 can rotate is occurred in the current sampling period.

According to various embodiments, when the rotation change amount exceeding the reference change amount is obtained, that is, when a rotation exceeding the maximum amount of change that the upper body 120 can rotate occurs, the excavator 200 may correct the sensing information in operation S530. For example, the excavator 200 may determine that invalid sensing information is acquired in the current sampling period and correct (or use) the valid sensing information obtained in the previous sampling period as the sensing information in the current sampling period. In addition, the excavator 200 may store the corrected sensing information as valid sensing information in operation S540.

According to various embodiments, when a rotation change amount that does not exceed the reference change amount is obtained, that is, when the rotation that does not exceed the maximum amount of change that the upper body 120 can rotate is occurred, the excavator 200 may store the current sampling period as valid sensing information in operation S530.

Figure 6:
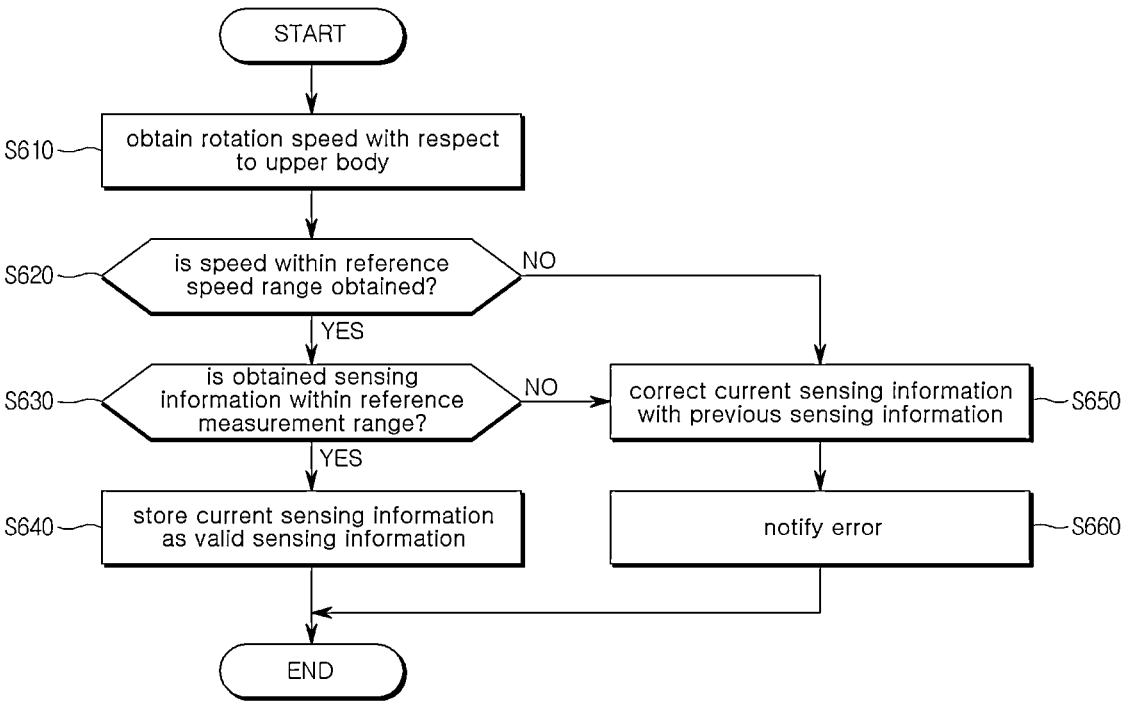
FIG. 6 is a flowchart of a second embodiment of a method of correcting sensing information in an excavator according to various embodiment.

FIG. 6 is a flowchart of a second embodiment of a method of correcting sensing information in the excavator 200 according to various embodiments. Operations in FIG. 6 described below may represent various embodiments of operations S430 and S440 in FIG. 4. In addition, in the following embodiments, each operation is not necessarily performed sequentially, and at least one operation among the disclosed operations may be omitted or other operations may be added.

Referring to FIG. 6, the excavator 200 according to various embodiments may obtain a rotation speed of the upper body 120 in operation S610. The rotation speed may be obtained based on the rotation angle measured in the previous sampling period and the rotation angle measured in the current sampling period.

According to various embodiments, the excavator 200 may determine whether a speed within a predefined reference speed range is obtained in operation S620. The reference speed may be the maximum speed at which the upper body 120 can rotate in the current sampling period.

According to various embodiments, when a speed that is not within a reference speed range is obtained, the excavator 200 may correct the sensing information and notify error occurrence in operations S650 and S660. According to one embodiment, in operation S650, the excavator 200 may perform a correction operation of replacing the sensing information obtained in the previous sampling period with the sensing information obtained in the current sampling period. In addition, the excavator 200 may output through the output device 250 that an error occurs in calculating the rotation angle with respect to the upper body 120 in operation S660 and update the error occurrence count.

According to various embodiments, when a speed within the reference speed range is obtained, the excavator 200 may determine whether the acquired sensing information is included in a reference measurement range in operation S630. The reference measurement range may be a range of normal sensing information measured by the rotation sensor.

According to various embodiments, when the sensing information is not included in the reference measurement range, the excavator 200 may perform an operation of correcting the sensing information and notifying error occurrence, like in operations S650 and S660 described above.

According to various embodiments, when the sensing information is not included in the reference measurement range, the excavator 200 may store the sensing information of the current sampling period as valid sensing information, like in operation S640.

Figure 7:
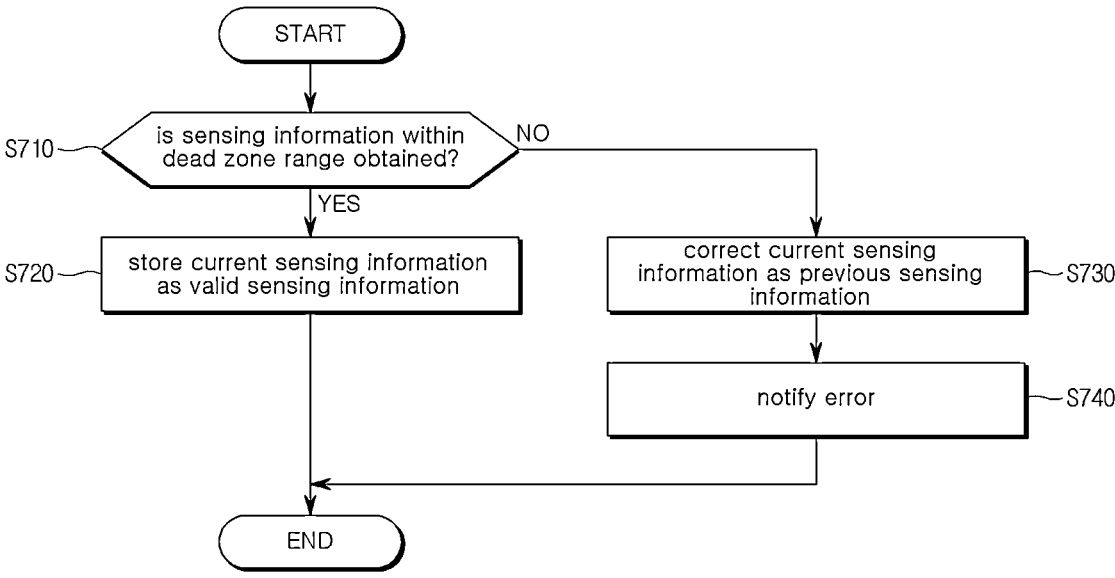
FIG. 7 is a flowchart of a third embodiment of a method of correcting sensing information in an excavator according to various embodiments.

FIG. 7 is a flowchart of a third embodiment of a method of correcting sensing information in the excavator 200 according to various embodiments. Operations in FIG. 7 described below may represent various embodiments of operations S430 and S440 in FIG. 4. In addition, in the following embodiments, each operation is not necessarily performed sequentially, and at least one operation among the disclosed operations may be omitted or other operations may be added.

Referring to FIG. 7, the excavator 200 according to various embodiments may determine whether the sensing information included in a dead zone range is output in operation S710. The dead zone range may be a sensing range (e.g., approximately 359° to 0.1°) in which rotation of the upper body 120 cannot be normally detected. According to one embodiment, the excavator 200 may determine whether the sensing information included in the dead zone range is output in a state in which rotation of the upper body 120 is stopped in the dead zone.

According to various embodiments, when the sensing information included in the dead zone range is obtained, the excavator 200 may store the sensing information of the current sampling period as valid sensing information in operation S720.

According to various embodiments, when the sensing information exceeding the dead zone range is obtained, the excavator 200 may determine that chattering has occurred, correct the sensing information, and notify error occurrence, like in operations S730 and S740. For example, the excavator 200 may perform a correction operation of replacing the sensing information obtained in the previous sampling period with the sensing information obtained in the current sampling period and update an error occurrence count. Accordingly, the chattering value measured within the dead zone range may be reduced, and thus rotation detection performance within the dead zone may be improved.

Figure 8:
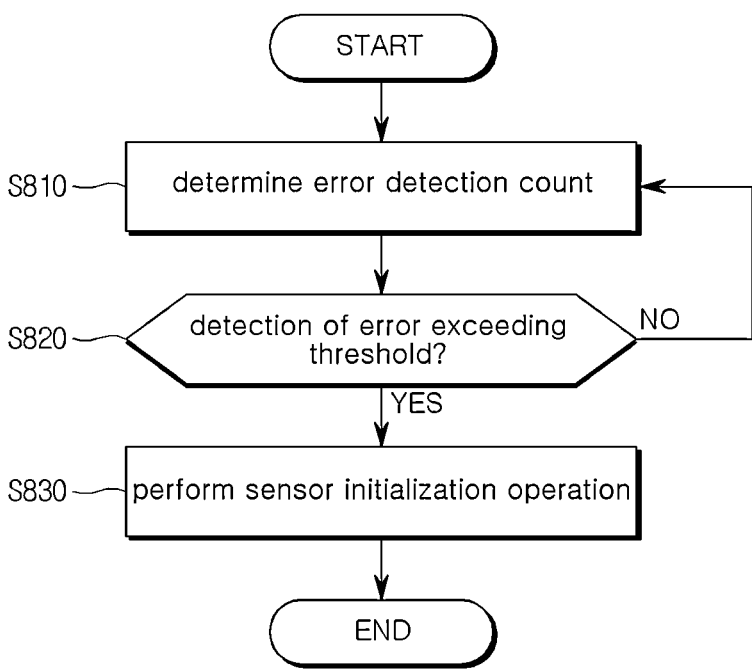
FIG. 8 is a flowchart of a sensor initialization method in an excavator according to various embodiments.

FIG. 8 is a flowchart of a sensor initialization method in an excavator 200 according to various embodiments. Operations in FIG. 8 described below may represent various embodiments of at least one operation among operations performed in FIGS. 4 to 7. In addition, in the following embodiments, each operation is not necessarily performed sequentially, and at least one operation among the disclosed operations may be omitted or other operations may be added.

Referring to FIG. 8, the excavator 200 according to various embodiments may determine a stored error detection count (or an error occurrence count) in operation S810. The number of error detections may be accumulated whenever a situation occurs in which the rotation amount change of the upper body 120 exceeds the reference change amount, a situation in which the sensing information exceeding the reference change amount is obtained by the rotation sensor, and a situation in which the sensing information exceeding the dead zone range (e.g., a chattering value) is obtained by the rotation sensor.

According to various embodiments, the excavator 200 may determine whether a number of errors greater than or equal to a threshold value is detected in operation S820. According to one embodiment, it may be determined whether the number of error detections is greater than or equal to a threshold value.

According to various embodiments, when a number of errors less than a threshold value is detected, the excavator 200 may re-perform the operation of determining whether a number of errors greater than or equal to a threshold value is detected.

According to various embodiments, when a number of errors greater than or equal to a threshold value is detected, the excavator 200 may perform a sensor initialization operation in operation S830. The sensor initialization operation may be an operation of correcting an output value of the rotation sensor. According to one embodiment, the excavator

200 may perform the sensor initialization operation of correcting an output value while rotating the upper body 120 at a reference speed.

The operation method of the excavator 200 according to embodiments of the present disclosure may be implemented as instructions stored in a computer-readable storage medium and executed by a processor (e.g., the processor 210).

Directly and/or indirectly and regardless of whether the storage media is in a raw state, in a formatted state, an organized state, or in any other accessible state, the storage media may include a relational database, a non-relational database, an in-memory database, and a database which can store a data and include a distributed type database, such as other suitable databases that allows access to the data through a storage controller. In addition, the storage medium includes a primary storage device, a secondary storage device, a tertiary storage device, an offline storage device, a volatile storage device, a nonvolatile storage device, a semiconductor storage device, a magnetic storage device, an optical storage device, and a flash storage device, a hard disk drive storage device, a floppy disk drive, a magnetic tape, or any type of storage device such as other suitable data storage medium.

Although the present disclosure has been described with reference to the embodiment shown in the drawings, this is just an example and it will be understood by those skilled in the art that various modifications and equivalent thereto may be made. Therefore, the true technical scope of the present disclosure should be determined by the spirit of the appended claims.

The invention claimed is:

1. An excavator, comprising:
a lower body;
an upper body rotatably mounted on the lower body;
a sensor device configured to collect sensing information related to a rotation angle of the upper body relative to the lower body, the sensing information including a dead zone in which the rotation angle is incorrectly provided; and
a processor electrically connected to the sensor device, wherein the processor is configured to:
detect occurrence of the dead zone based on the sensing information collected by the sensor device;
correct the sensing information in response to detection of the occurrence of the dead zone; and
calculate the rotation angle of the upper body based on the corrected sensing information,
wherein the processor is further configured to initialize the sensor device while rotating the upper body at a reference speed when a number of errors greater than or equal to a threshold value,
wherein the processor is further configured to:
determine the occurrence of the dead zone when a rotation change amount, which is a difference between first sensing information in a current frame period and second sensing information in a previous frame period, with a reference change amount exceeds the reference change amount; or
determine the occurrence of the dead zone when the sensing information exceeds a reference measurement range which is a sensing range of the sensor device.

2. The excavator of claim 1, wherein the sensor device comprises:
a first sensor member fixed to the upper body; and
a second sensor member fixed to the lower body.

3. The excavator of claim 1, wherein the processor is further configured to:

store the sensing information collected in a state in which the occurrence of the dead zone is not detected as valid sensing information, and correct the sensing information with the stored valid sensing information in response to detection of the occurrence of the dead zone.

4. The excavator of claim 1, wherein the processor is further configured to:

correct the sensing information obtained in the current frame period with the sensing information obtained in the previous frame period in response to detection of the occurrence of the dead zone.

5. The excavator of claim 1, wherein the processor is further configured to record a number of error detections after correcting the sensing information.

6. A method for operating an excavator, the method comprising:

collecting, by a sensor device, sensing information related to rotation angle of an upper body of the excavator, the sensing information including a dead zone in which the rotation angle is incorrectly provided;

detecting, by a processor, occurrence of the dead zone based on the sensing information;

correcting, by the processor, the sensing information in response to detection of the occurrence of the dead zone; and calculating, by the processor, the rotation angle of the upper body based on the corrected sensing information, wherein the detecting occurrence of the dead zone based on the sensing information comprises:

determining the occurrence of the dead zone when a rotation change amount, which is a difference between a first sensing information in a current frame period and a second sensing information in a previous frame period, with a reference change amount exceeds the reference change amount; or determining the occurrence of the dead zone when the sensing information exceeds a reference measurement range which is a sensing range of the sensor device, wherein the method further comprises:

initializing the sensor device while rotating the upper body at a reference speed when a number of errors greater than or equal to a threshold value.

7. The method of claim 6, further comprising:

storing, by the processor, the sensing information collected in a state in which the occurrence of the dead zone is not detected as valid sensing information, wherein the correcting the sensing information comprises:

correcting the sensing information with the stored valid sensing information.

8. The method of claim 6, wherein the correcting the sensing information comprises:

correcting the sensing information obtained in the current frame period with the sensing information obtained in the previous frame period.

9. The method of claim 6, further comprising recording a number of error detections after correcting the sensing information.

* * * * *